United States Patent
Wang et al.

(10) Patent No.: US 7,403,997 B2
(45) Date of Patent: Jul. 22, 2008

(54) METHOD FOR DYNAMICALLY ALLOCATING IP ADDRESSES FOR HOSTS ON A NETWORK

(75) Inventors: Gongqian Wang, Shenzhen (CN); Tang He, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 859 days.

(21) Appl. No.: 10/830,811

(22) Filed: Apr. 23, 2004

(65) Prior Publication Data

US 2005/0021855 A1    Jan. 27, 2005

(30) Foreign Application Priority Data

Jun. 6, 2003    (TW) ............................... 92115459 A

(51) Int. Cl.
*G06F 15/16* (2006.01)
(52) U.S. Cl. ...................... 709/228; 709/201; 709/220; 709/223
(58) Field of Classification Search ................ 709/201, 709/220, 223, 228
See application file for complete search history.

(56) References Cited

U.S. PATENT DOCUMENTS

| | | | | |
|---|---|---|---|---|
| 5,884,024 A | * | 3/1999 | Lim et al. ...................... | 726/3 |
| 6,009,103 A | * | 12/1999 | Woundy ...................... | 370/401 |
| 6,070,187 A | * | 5/2000 | Subramaniam et al. ...... | 709/220 |
| 6,073,178 A | * | 6/2000 | Wong et al. .................. | 709/229 |
| 6,223,222 B1 | * | 4/2001 | Fijolek et al. ................ | 709/227 |
| 6,243,749 B1 | * | 6/2001 | Sitaraman et al. ........... | 709/223 |
| 6,654,387 B1 | * | 11/2003 | Beser et al. .................. | 370/485 |
| 7,007,080 B2 | * | 2/2006 | Wilson ........................ | 709/221 |
| 7,174,371 B2 | * | 2/2007 | Elo et al. ..................... | 709/220 |
| 2002/0198881 A1 | * | 12/2002 | Banerjee et al. ............... | 707/10 |
| 2004/0073600 A1 | * | 4/2004 | Elo et al. ..................... | 709/201 |

OTHER PUBLICATIONS

Jiaming Zhong DHCP Application into Wide-Base Man, Journal of Chenzhou Teachers College, Oct. 2001, p. 88-91, vol. 22 No. 5, Chenzhou, P. R. China.

Qiaohong Zhang, Changqing An, Xuenong Li, Yiqi Fu, The application of DHCP in Tsinghua University Campus Network, Computer Engineering and Application, Oct. 2001, p. 50-52, p. 72, Beijing, P. R. China.

* cited by examiner

*Primary Examiner*—Michael Won
(74) *Attorney, Agent, or Firm*—Wei Te Chung

(57) ABSTRACT

A dynamical host allocation method employed in a dynamical host allocation system (100) is disclosed. The employed dynamical host allocation system includes a plurality of DHCP servers (110), a DHCP relay (120), a plurality of DHCP clients (130) and a network (140) interconnecting all these apparatuses. When allocating IP addresses to the plurality of DHCP clients, the plurality of DHCP servers determine whether the IP addresses are free by way of successive logic checks. Therefore, the problem of allocating an IP address to more than one DHCP clients is resolved.

8 Claims, 5 Drawing Sheets

METHOD FOR DYNAMICALLY ALLOCATING IP ADDRESSES FOR HOSTS ON A NETWORK

BACKGROUND OF THE INVENTION

1. Field of the Invention

The present invention relates to a method for allocating IP (Internet protocol) addresses for hosts on a computer network.

2. Background of the Invention

In order to access information sources from a TCP/IP (Transmission Control Protocol/Internet Protocol) network, each host on the TCP/IP network should be allocated some requested configuration parameters, such as IP address, subnet mask, default gateway, domain name server, etc. The subnet mask is a required setting on any host that communicates on an IP network. The setting is commonly represented in the same format as an IP address, except that the values usually are either 255 or 0. As far as a large-scale network is concerned, it is laborious work for web masters to manage and maintain hosts on the network. If a host is moved from one subnet to another subnet, the configuration parameters of the host need to be changed. Host users ordinarily do not have the expertise or authority to re-configure their hosts. Therefore, a mechanism is needed which allows web masters other than host users to manage and configure hosts on a TCP/IP network. One solution is the mechanism of DHCP.

DHCP stands for dynamic host configuration protocol, which originated from BOOT protocol (BOOTP). BOOTP is applied on networks connected by hosts having no disks. On this kind of network, hosts are started and connected to the network by use of BOOT ROMs other than disks, and the BOOTP can set the TCP/IP environment for the hosts automatically. DHCP is a kind of improved BOOTP, and generally comprises two parts: a DHCP server and a DHCP client. The DHCP server manages all IP information on the network, and processes requests from the DHCP client. The DHCP client uses IP information distributed by the DHCP server.

DHCP supports three different mechanisms to allocate IP addresses to hosts on a network: automatic allocation, dynamic allocation, and manual allocation. Under the automatic allocation mechanism, if a DHCP client successfully leases an IP address from a DHCP server, the DHCP client can use the IP address for an unlimited time. Under the dynamic allocation mechanism, if a DHCP client leases an IP address from a DHCP server, the DHCP client cannot always use the IP address. If the lease of the IP address expires, the DHCP client must relinquish ("release") the IP address. In such case, the DHCP client has first priority in renewing the lease of the IP address, or in leasing another IP address from the DHCP server. Under the manual allocation mechanism, IP addresses of DHCP clients are allocated by hand input by web masters.

The process of using DHCP follows the steps of: (1) when started, a DHCP client broadcasts a DHCPDISCOVER message to DHCP servers on a subnet for leasing an IP address; (2) after receiving the DHCPDISCOVER message, each DHCP server respectively sends to the DHCP client a DHCPOFFER message that comprises an available IP address and other configuration parameters; (3) the DHCP client selects one DHCP server based on the configuration parameters, and broadcasts a DHCPREQUEST message which includes information that indicates which DHCP server it has selected; and (4) the selected DHCP server responds with a DHCPACK message to the DHCP client to validate leasing of the IP address, or responds with a DHCP-NAK message to the DHCP client to refuse leasing of the IP address, and updates the database of the selected DHCP server. Generally, leasing an IP address only needs performance of the above-mentioned four steps. If the DHCP client finds that the leased IP address is used by another DHCP client, such as by use of an address resolution protocol (ARP), the DHCP client can send a DHCPDECLINE message to the DHCP server and re-perform the said four-step process for leasing a new IP address. If the DHCP client no longer leases the IP address, it can send a DHCPRELEASE message to the DHCP server. If the DHCP client wants to change one or more configuration parameters, it can send a DHCPINFORM message to the DHCP server to request such change.

Even though DHCP can greatly facilitate managing a large-scale network and allocating configuration parameters to different DHCP clients, it has some shortcomings. For example, when a DHCP server allocates IP addresses to more than one DHCP client, it is prone to allocate conflicting IP addresses. Thus, a system and method is needed for allocating IP addresses to DHCP clients, in which conflict between the allocated IP addresses is eliminated.

SUMMARY OF THE INVENTION

Accordingly, an object of the present invention is to provide a convenient dynamic host allocating method for allocating of IP addresses to DHCP clients by DHCP servers.

Another object of the present invention is to provide a dynamic host allocating method, which can check IP addresses allocated to DHCP clients in order to avoid conflict among the allocated IP addresses.

In order to accomplish the above-mentioned objects, a dynamic host allocating method of the present invention comprises the following steps: (a) initiating a DHCP message packet comprising an IP address and other configuration parameters; (b) obtaining a hardware address of a DHCP client from a chaddr field of a DHCPDISCOVER message packet broadcasted by the DHCP client; (c) determining whether the DHCP client is on a same subnet as the DHCP server, and sending the DHCP message packet to the DHCP client if the DHCP client is on a same subnet as the DHCP server; (d) determining whether the DHCP client has a lease with the DHCP server if the DHCP client is not on a same subnet as the DHCP server, and sending the DHCP message packet to the DHCP client if the DHCP client has a lease with the DHCP server; (e) determining whether the IP address is an IP address requested by the DHCP client if the DHCP client has no lease with the DHCP server; (f) determining whether the IP address is in a lease range of the DHCP server if the IP address is an IP address requested by the DHCP client; and (g) sending the DHCP message packet including the IP address to the DHCP client if the IP address is in the lease range of the DHCP server.

A preferred dynamic host allocating method according to the present invention further comprises the following steps: (h) determining whether there is a free IP address in the lease range of the DHCP server if the IP address is not an IP address requested by the DHCP client, or the IP address is not in the lease range of the DHCP server; (i) confirming whether the free IP address is in fact not used by any other DHCP client, and sending the DHCP message packet to the DHCP client If the free IP address is not used by any other DHCP client; (j) determining whether there is an expired IP address in the lease range of the DHCP server If there is no free IP address, or if the free IP address is used by another DHPC client; and (k) confirming whether the expired IP address is not used by any other DHCP client, and sending the DHCP message packet including the expired IP address to the DHCP client if the expired IP address is not used by any other DHCP client.

Other objects, advantages and novel features of the present invention will be drawn from the following detailed description of preferred embodiments of the present invention with the attached drawings, in which:

DETAILED DESCRIPTION OF PREFERRED EMBODIMENTS OF THE INVENTION

Figure 1:
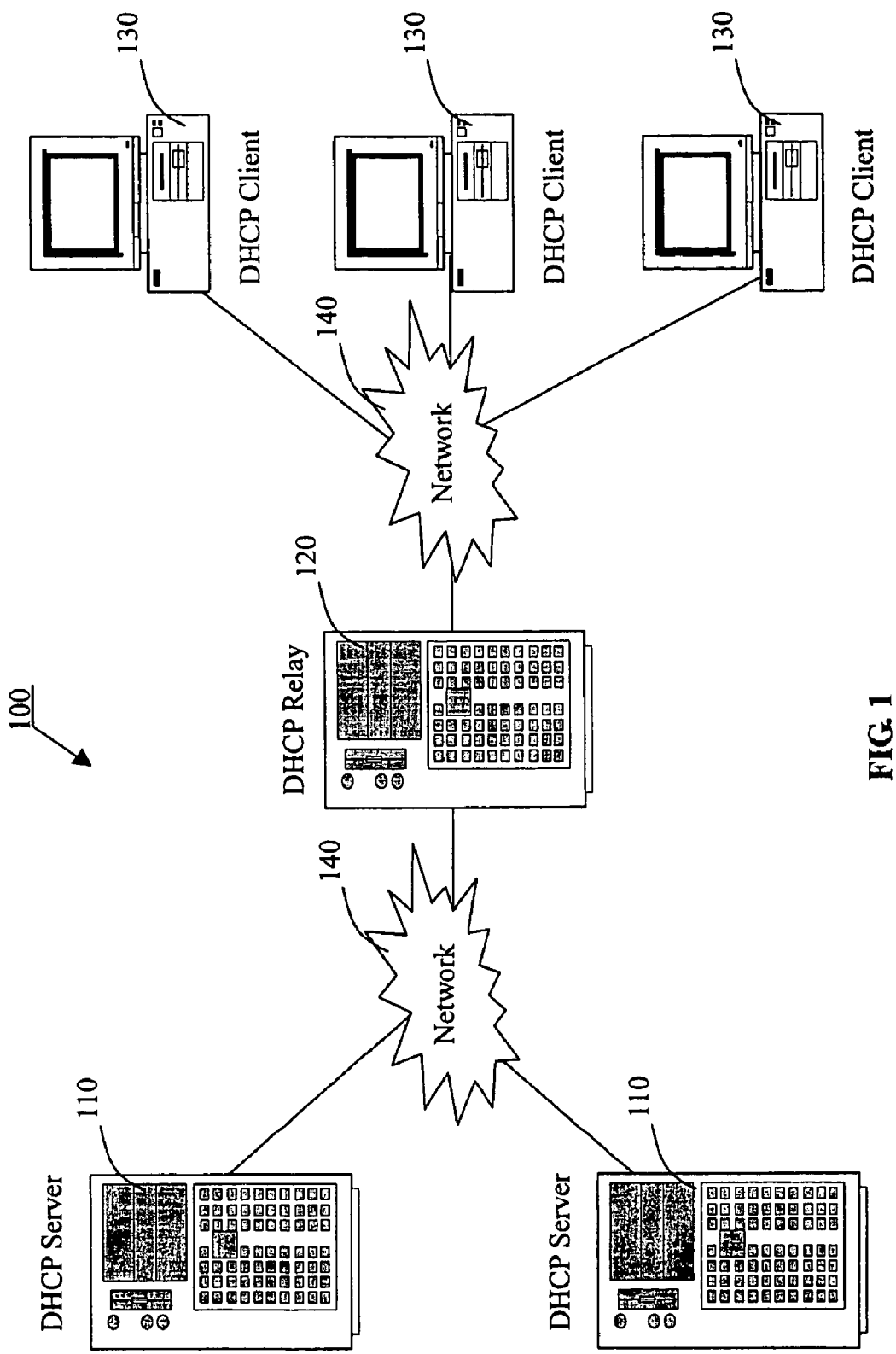
FIG. 1 is a schematic diagram of a dynamic host allocating system employed according to a preferred embodiment of the present invention.

FIG. 1 is a schematic diagram of a dynamic host allocating system 100 employed according to the preferred embodiment of the present invention. The dynamic host allocating system 100 comprises a plurality of DHCP servers 110, a DHCP relay 120, a plurality of DHCP clients 130, and a network 140 that interconnects all these apparatuses. The DHCP clients 130 are hosts on the network 140, and obtain configuration parameters from the DHCP servers 110. The DHCP relay 120 is a host or a router, which is used for transmitting DHCP message packets between the DHCP clients 130 and the DHCP servers 110. In the preferred embodiment of the present invention, the network 140 is an Ethernet. In alternative embodiments, the network 140 may be any other suitable kind of electronic communication network known in the art.

Figure 2:
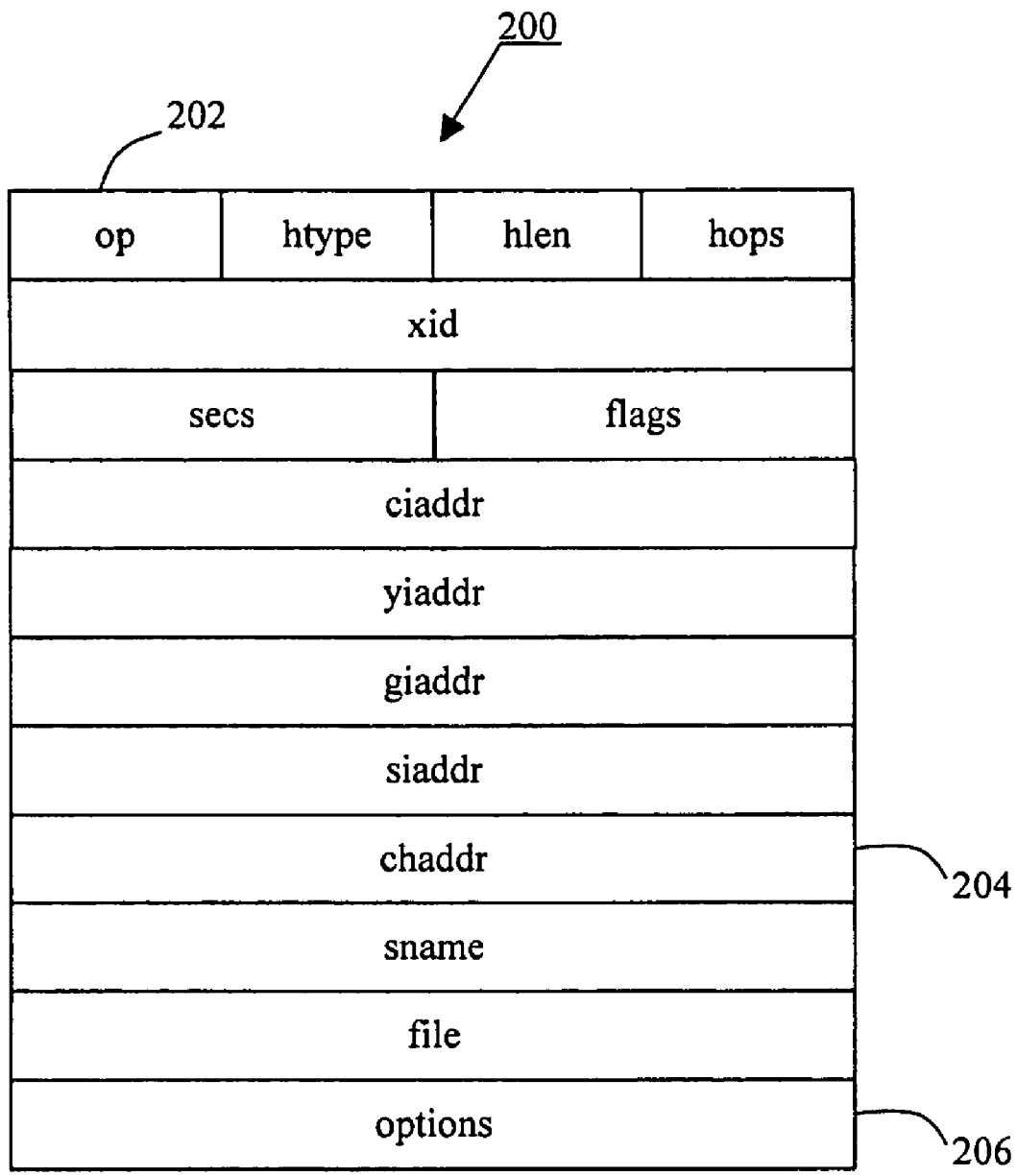
FIG. 2 is a schematic diagram of a DHCP message packet format according to the preferred embodiment of the present invention.

The DHCP clients 130 communicate with the DHCP servers 110 by use of DHCP message packets. FIG. 2 is a schematic diagram of a DHCP message packet 200 format used according to the preferred embodiment of the present invention. Structurally, the DHCP message packet 200 includes an op field 202, a chaddr field 204, and an options field 206. (For the sake of brevity, other fields shown in the DHCP message packet 200 are not described in detail herein.) Each DHCP message packet 200 is signed by encoding the op field 202 to indicate which apparatus sends the DHCP message packet; that is, one of the DHCP servers 130 or one of the DHCP clients 110. If the op field 202 is encoded as BOOTREQUEST, this indicates that the DHCP message packet 200 is sent by one of the DHCP clients 130. If the op field 202 is encoded as BOOTREPLY, this indicates that the DHCP message packet 200 is sent by one of the DHCP servers 110. The chaddr field 204 is used for recording the hardware address of the particular DHCP client 130 (also known as a MAC address). Functionally, each DHCP message packet 200 is one of several types, such as DHCPDISCOVER, DHCPOFFER, DHCPREQUEST or DHCPACK. The type of each DHCP message packet 200 is encoded into the options field 206.

Figure 3:
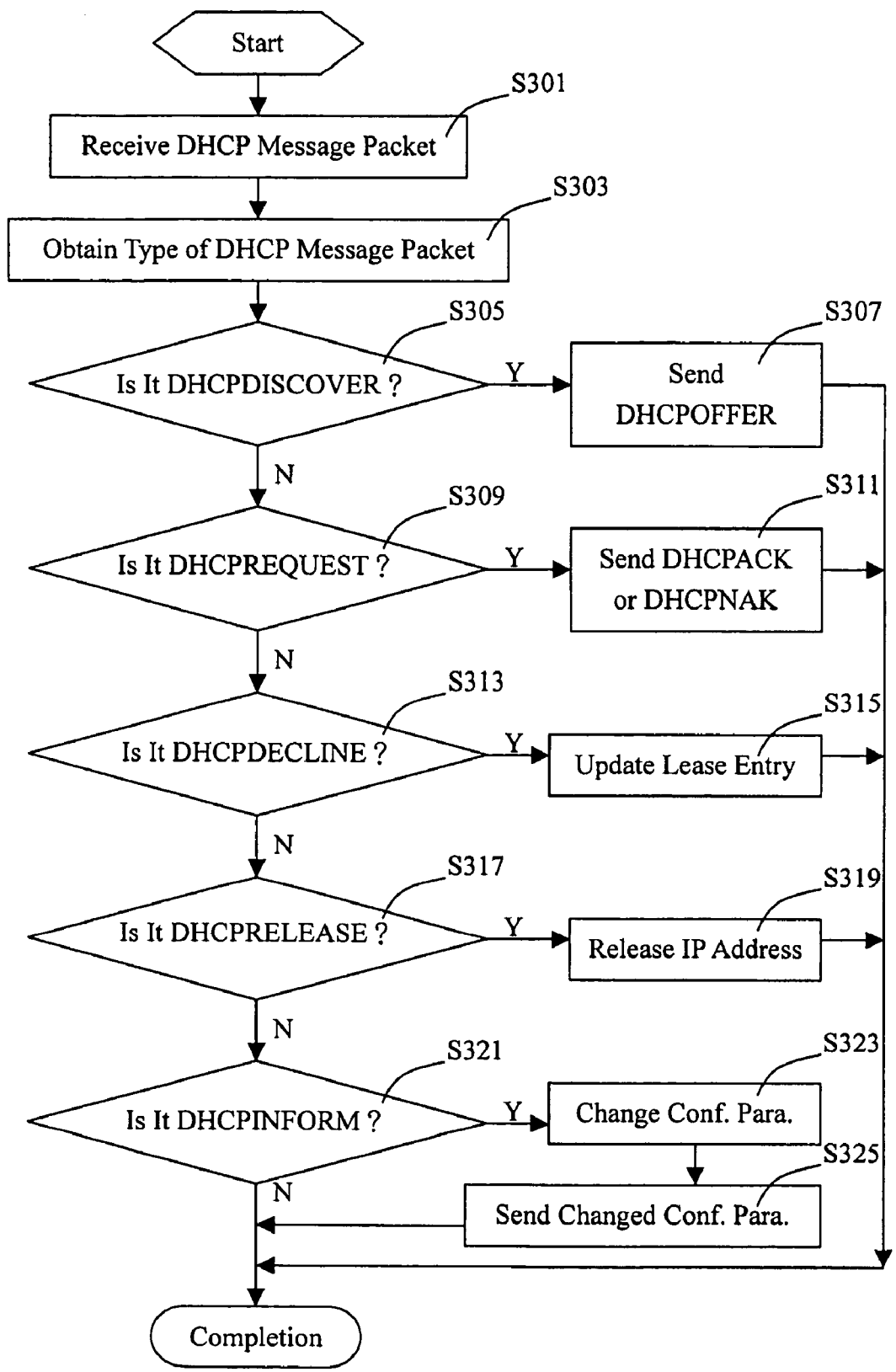
FIG. 3 is a flow chart of a DHCP server receiving and sending a DHCP message packet, in accordance with the present invention.

FIG. 3 is a flow chart of a DHCP server 110 receiving and sending a DHCP message packet 200, in accordance with the present invention. At step S301, the DHCP server 110 receives a DHCP message packet 200 transmitted by the DHCP relay 120. At step S303, the DHCP server 110 obtains the type of the DHCP message packet 200 from the options field 206 thereof. At step S305, the DHCP server 110 determines whether the type of the DHCP message packet 200 is DHCPDISCOVER. If the type of the DHCP message packet 200 is DHCPDISCOVER, at step S307, the DHCP server 110 sends a DHCPOFFER message packet to the DHCP client 130 that broadcasts the DHCPDISCOVER message packet, via the DHCP relay 120. The DHCPOFFER message packet comprises an available IP address. If the type of the DHCP message packet 200 is not DHCPDISCOVER, at step S309, the DHCP server 110 determines whether the type of the DHCP message packet 200 is DHCPREQUEST. If the type of the DHCP message packet 200 is DHCPREQUEST, at step S311, the DHCP server 110 sends a DHCPACK message packet to the DHCP client 130 that broadcasts the DHCPREQUEST message packet. The DHCPACK message packet comprises configuration parameters requested by the DHCP client 130. However, if the DHCP server 110 has no available IP address to distribute to the DHCP client 130, the DHCP server 110 instead sends a DHCPNAK message packet to the DHCP client 130. The DHCPNAK message packet is for refusing to lease an IP address to the DHCP client 130. If the DHCP client 130 receives the DHCPNAK message packet, it should broadcast a new DHCPDISCOVER message packet for requesting configuration parameters. If the type of the DHCP message packet 200 is not DHCPREQUEST, at step S313, the DHCP server 110 determines whether the type of the DHCP message packet 200 is DHCPDECLINE. If the type of the DHCP message packet 200 is DHCPDECLINE, at step S315, the DHCP server 110 updates a relevant lease entry. If the type of the DHCP message packet 200 is not DHCPDECLINE, at step S317, the DHCP server 110 determines whether the type of the DHCP message packet 200 is DHCPRELEASE. If the type of the DHCP message packet 200 is DHCPRELEASE, at step S319, the DHCP server 110 releases the IP address of the lease signed with the DHCP client 130 that broadcasts the DHCPRELEASE message packet. If the type of the DHCP message packet 200 is not DHCPRELEASE, at step S321, the DHCP server 110 determines whether the type of the DHCP message packet 200 is DHCPINFORM. If the type of the DHCP message packet 200 is DHCPINFORM, at step S323, the DHCP server 110 changes configuration parameters according to details requested in the DHCPINFORM message packet. Then at step S325, the DHCP server 110 sends the changed configuration parameters to the DHCP client 130 that broadcasts the DHCPINFORM message packet.

Figure 4:
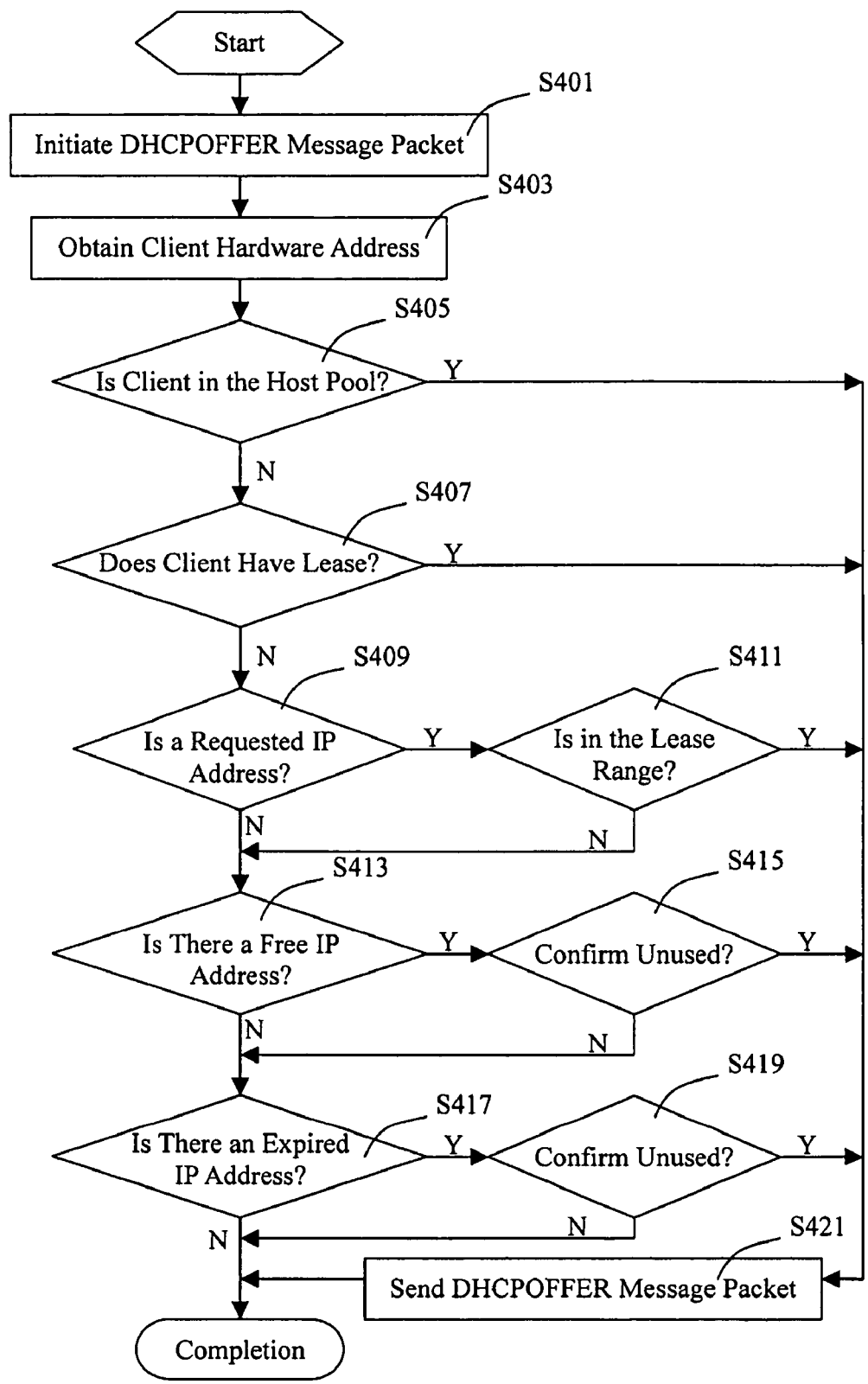
FIG. 4 is a flow chart of checking whether there is any IP address conflict when a DHCP server distributes an IP address to a DHCP client, in accordance with the present invention.

FIG. 4 is a flow chart of checking whether there is any IP address conflict when a DHCP server 110 distributes an IP address to a DHCP client 130, in accordance with the present invention. It is hereafter assumed that the DHCP server 110 sends a DHCPOFFER message packet. At step S401, the DHCP server 110 initiates the DHCPOFFER message packet that comprises an IP address and other configuration parameters. At step S403, the DHCP server 110 obtains the hardware address of a DHCP client 130 from the chaddr field 204 of a DHCPDISCOVER message packet broadcasted by the DHCP client 130. At step S405, the DHCP server 110 determines whether the DHCP client 130 is a host that belongs to a host pool of the DHCP server 110. Hosts in a host pool of a DHCP server 110 refer to those DHCP clients 130 that are in a same subnet as the DHCP server 110. If the DHCP client 130 belongs to the host pool, at step S421, the DHCP server 110 sends the DHCPOFFER message packet including the IP address to the DHCP client 130. If the DHCP client 130 does not belong to the host pool, at step S407, the DHCP server 110 determines whether the DHCP client 130 has a lease with the DHCP server 110. If the DHCP client 130 has a lease with the DHCP server 110, at step S421, the DHCP server 110 sends the DHCPOFFER message packet including the IP address to the DHCP client 130. If the DHCP client 130 does not have a lease with the DHCP server 110, at step S409, the DHCP server 110 determines whether the IP address is an IP address requested by the DHCP client 130. If the IP address is an IP address requested by the DHCP client 130, at step S411, the DHCP server 110 determines whether the IP address is in a lease range of the DHCP server 110. The lease range of the DHCP server 110 comprises all IP addresses that the DHCP server 110 can lease. If the IP address is in the lease range of the DHCP server 110, at step S421, the DHCP server 110 sends the DHCPOFFER message packet including the IP address to the DHCP client 130. If the IP address is not an IP address requested by the DHCP client 130, or if the IP address is not in the lease range of the DHCP server 110, at step S413, the DHCP server 110 determines whether there is a free IP address in the lease range of the DHCP server 110. If there is a free IP address, at step S415, the DHCP server 110 confirms whether the free IP address is not used by any other DHCP client 130. If the free IP address is not used by any other DHCP client 130, at step S421, the DHCP server 110 sends the DHCPOFFER message packet including the free IP address to the DHCP client 130. If there is no free IP address, or if the free IP address is used by another DHPC client 130, at step S417, the DHCP server 110 determines whether there is an expired IP address in the lease range of the DHCP server 110. If there is an expired IP address, at step S419, the DHCP server 110 confirms whether the expired IP address is not used by any other DHCP client 130. If the expired IP address is not used by any other DHCP client 130, at step S421, the DHCP server 110 sends the DHCPOFFER message packet including the expired IP address to the DHCP client 130. If there is no expired IP address, or if the expired IP address is used by another DHCP client 130, the DHCP server 110 does not send the DHCPOFFER message packet to the DHCP client 130, and the procedure is completed.

Figure 5:
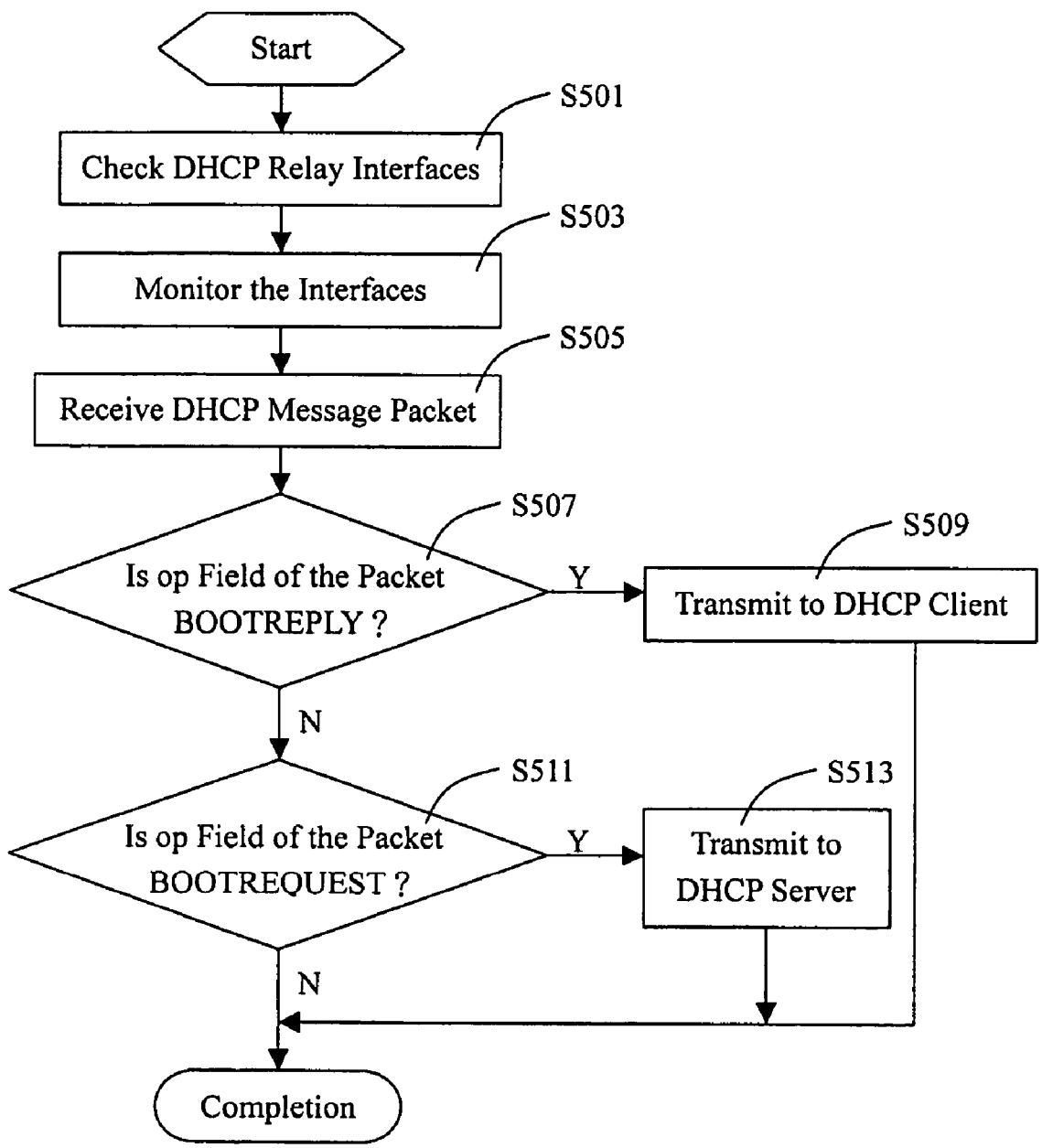
FIG. 5 is a flow chart of a DHCP relay determining the type of DHCP message packet received, in accordance with the present invention.

FIG. 5 is a flow chart of the DHCP relay 120 determining the type of DHCP message packet 200 received, in accordance with the present invention. At step S501, the DHCP relay 120 checks whether interfaces thereof are available. The interfaces comprise an interface communicating with the DHCP server 110, and an interface communicating with the DHCP client 130. At step S503, the DHCP relay 120 starts a task to monitor the interfaces. When the DHCP server 110 or the DHCP client 130 sends DHCP message packets 200 to the other, the DHCP message packets 200 are firstly received by the DHCP relay 120 via the respective interfaces. At step S505, the DHCP relay 120 receives a DHCP message packet 200. At step S507, the DHCP relay 120 determines whether the op field 202 of the received DHCP message packet 200 is BOOTREPLY. If the op field 202 of the received DHCP message packet 200 is BOOTREPLY, at step S509, the DHCP relay 120 transmits the DHCP message packet 200 to the DHCP client 130. If the op field 202 of the received DHCP message packet 200 is not BOOTREPLY, at step S511, the DHCP relay 120 determines whether the op field 202 of the received DHCP message packet 200 is BOOTREQUEST. If the op field 202 of the received DHCP message packet 200 is BOOTREQUEST, at step S513, the DHCP relay 120 transmits the DHCP message packet 200 to the DHCP server 110.

If the op field 202 of the received DHCP message packet 200 is neither BOOTREPLY nor BOOTREQUEST, the DHCP relay 120 does not transmit the DHCP message packet 200, and the procedure is completed.

Although only preferred embodiments of the present invention have been described in detail above, those skilled in the art will readily appreciate that many modifications to the preferred embodiments are possible without materially departing from the novel teachings and advantages of the present invention. Accordingly, all such modifications are deemed to be covered by the following claims and allowable equivalents of the claims.

What is claimed is:

1. A dynamic host allocating method, which is employed by a dynamic host configuration protocol (DHCP) server for distributing an Internet protocol IP) address to a DHCP client, the method comprising the sequential steps of:
    obtaining a hardware address of the DHCP client from a chaddr field of a DHCPDISCOVER message packet broadcasted by the DHCP client;
    determining whether the DHCP client is on a same subnet as the DHCP server;
    determining whether the DHCP client has a lease with the DHCP sever if the DHCP client is not on a same subnet as the DHCP server;
    determining whether there is a free IP address in a lease range of the DHCP server, by the DHCP server, if the DHCP client has no lease with the DHCP server;
    determining whether there is an expired IP address in the lease range of the DHCP server, by the DHCP server, if there is no free IP address; and
    sending a DHCP message packet including the expired IP address if there is an expired IP address.

2. The dynamic host allocating method as claimed in claim 1, further comprising the following step before the step of obtaining a hardware address of the DHCP client from a chaddr field of a DHCPDISCOVER message packet broadcasted by the DHCP client:
    initiating a DHCP message packet comprising an IP address and other configuration parameters.

3. The dynamic host allocating method as claimed in claim 1, wherein the step of determining whether the DHCP client has a lease with the DHCP server further comprises the step of:
    sending a DHCP message packet comprising an IP address to the DHCP client if the DHCP client has a lease with the DHCP server.

4. The dynamic host allocating method as claimed in claim 1, wherein the step of determining whether there is a free IP address in a lease range of the DHCP server further comprises the steps of:
    confirming whether the free IP address is not used by another DHCP client if there is a free IP address; and
    sending a DHCP message packet comprising the free IP address to the DHCP client if the free IP address is not used by another DHCP client.

5. The dynamic host allocating method as claimed in claim 1, further comprising the following step before the step of sending a DHCP message packet including the expired IP address:
    confirming whether the expired IP address is not used by another DHCP client.

6. The dynamic host allocating method as claimed in claim 2, further comprising the following step before the step of determining whether there is a free IP address in a lease range of the DHCP server:

determining whether the IP address is an IP address requested by the DHCP client.

7. The dynamic host allocating method as claimed in claim 6, further comprising the step of:
   determining whether the IP address is in a lease range of the DHCP server.

8. A dynamic host allocating method, which is employed by a dynamic host configuration protocol (DHCP) server for distributing an Internet protocol (IP) address to a DHCP client, the method comprising the sequential steps of;
   initiating a DHCP message packet comprising an IP address and other configuration parameters;
   obtaining a hardware address of the DHCP client from a chaddr field of a DHCPDISCOVER message packet broadcasted by the DHCP client;
   determining whether the DHCP client is on a same subnet as the DHCP server, and sending the DHCP message packet to the DHCP client if the DHCP client is on a same subnet as the DHCP server;
   determining whether the DHCP client has a lease with the DHCP server if the DHCP client is not on a same subnet as the DHCP server, and sending the DHCP message packet to the DHCP client if the DHCP client has a lease with the DHCP server;
   determining whether the IP address is an IP address requested by the DHCP client, by the DHCP server, if the DHCP client has no lease with the DHCP server;
   determining whether the IP address is in a lease range of the DHCP server if the IP address is an IP address requested by the DHCP client; and
   sending the DHCP message packet including the IP address to the DHCP client if the IP address is in the lease range of the DHCP server.

* * * * *